United States Patent Office 2,880,848
Patented Apr. 7, 1959

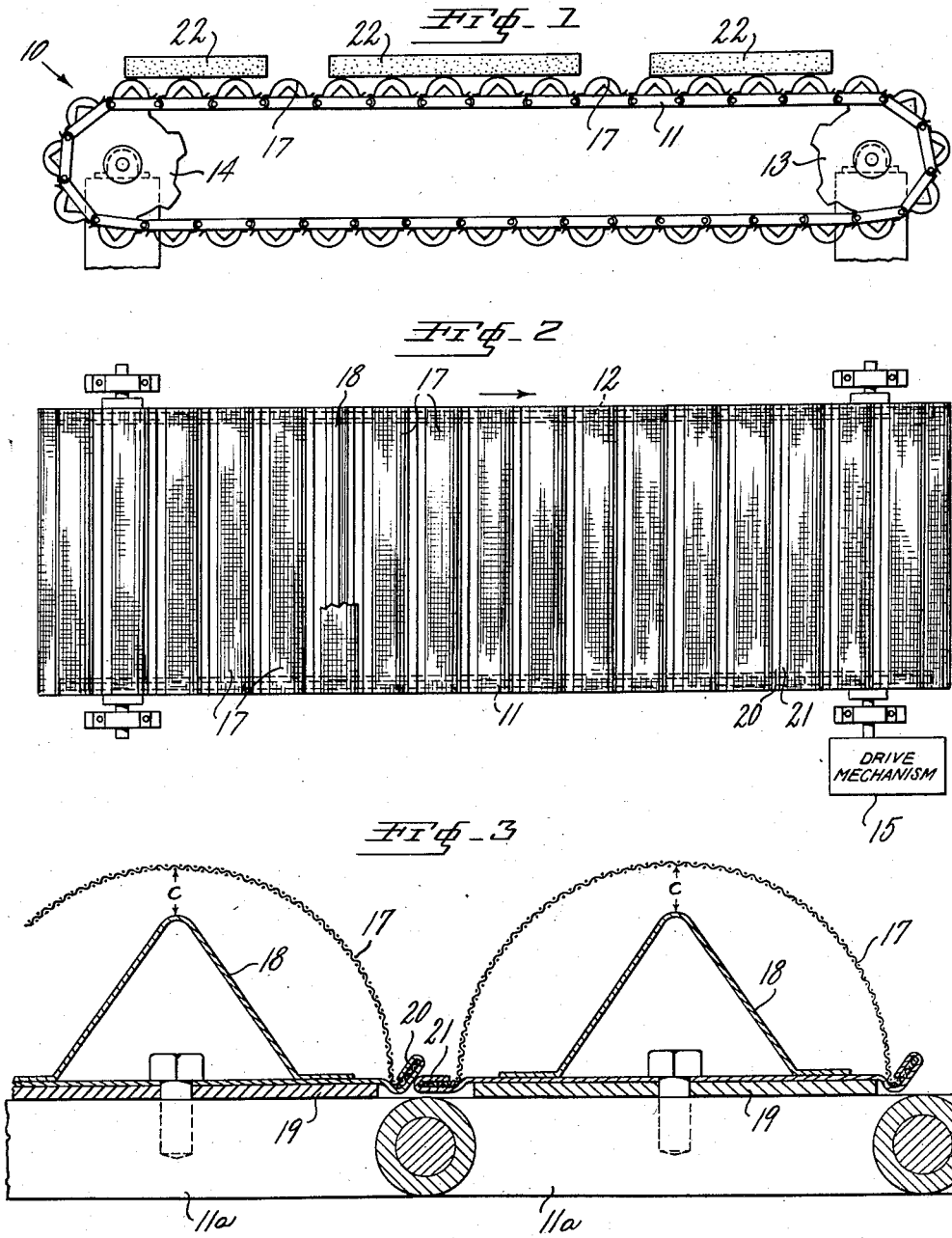

2,880,848
SCREEN CONVEYOR

Warren J. Lundy, Elmhurst, and Kenneth I. Swan, Libertyville, Ill., assignors to United States Rubber Company, New York, N.Y., a corporation of New Jersey Application May 14, 1958, Serial No. 735,324

4 Claims. (Cl. 198—131)

This invention relates to screen conveyors and, more particularly, to screen conveyors suitable for carrying elastomeric stock during a heating operation.

When conveying elastomeric stock such as during preheating prior to forming automative parts, it is necessary to provide a high stock temperature with a uniform distribution of heat to provide uniform relief of stresses in the stock occurring during processing. Prior conveyors have, in general, been unsuitable for such an application in that the heat was not uniformly distributed or the conveyors were subject to sagging or deformation.

It is an object of the present invention to provide a new and improved screen conveyor providing improved distribution of heat during a heating operation.

It is another object of the invention to provide a new and improved screen conveyor which is protected against permanent deformation due to excessive stresses which may occur during normal operation.

In accordance with the invention, a screen conveyor comprises a pair of longitudinal supporting members and transverse conveyor sections attached to said supporting members. Each of the conveyor sections has a convex screen surface and a rigid member disposed beneath the screen surface and spaced therefrom with a clearance sufficiently small to prevent permanent deformation of the screen surface when subjected to stress greater than its elastic limit.

Referring now to the drawing:

Fig. 1 is a side view of a screen conveyor constructed in accordance with the invention;

Fig. 2 is a plan view of the Fig. 1 conveyor; and

Fig. 3 is a side view to an expanded scale of the transverse conveyor slats of the Fig. 1 conveyor.

Referring now to Figs. 1 and 2, the screen conveyor 10 comprises a pair of side chains 11, 12 and sprocket drive means 13, 14 therefor. A suitable drive motor and gear box 15 is represented schematically in Fig. 2. Transverse conveyor sections are attached to the side chains.

Referring now to Fig. 3, each of the conveyor sections has a convex screen surface 17 of substantially semi-circular shape. A rigid member preferably comprising an inverted substantially V-shaped bar 18 is disposed beneath the screen surface and is spaced therefrom with a clearance $c$ approximately equal to ¼ the radius of the screen surface 17 to allow air circulation between the screen surface and the bar 18 and to prevent permanent deformation of the screen surface when subjected to stress greater than its elastic limit.

As represented in Fig. 2 the bar 18 extends under the length of the conveyor section 16.

As represented in Fig. 3, the diameter of the screen surface is substantially equal to the pitch of the chain links 11a. The base 19 of each slat is bolted to the corresponding chain link. The ends 20, 21 of the conveyor sections are in an overlapping relation to prevent stock from dropping between the conveyor sections and to allow motion around a curve.

During operation elastomeric stock to be heated is placed on the conveyor as represented in Fig. 1. The stock is carried through an oven not shown and air circulates uniformly around the stock because there is a minimum surface area of the conveyor in contact with the stock. Accordingly, a minimum of heat is dissipated by conduction away from the stock, thereby allowing efficient and uniform heating of the stock. The curved surface 17 provides a minimum contact area with the stock and yet provides sufficient strength to carry the stock. The inverted V-shaped bar 18 provides strength for the conveyor section and prevents permanent deformation of the screen surface when, for example, an operator's hand accidently exerts a stress on the screen surface greater than its elastic limit and which would otherwise cause permanent deformation of the screen surface. Also, in the event the screen surface 17 is forced down against the bar 18, there is a minimum contact surface between the screen and the bar, minimizing heat dissipation.

While there has been described what is at present believed to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. A screen conveyor comprising a pair of longitudinal supporting members; transverse conveyor sections attached to said supporting members, each of said sections having a convex screen surface and a rigid member disposed beneath said screen surface and spaced therefrom with a clearance sufficiently small to prevent permanent deformation of said screen surface when subjected to stress greater than its elastic limit.

2. A screen conveyor comprising a pair of side chains and sprocket drive means therefor; transverse conveyor sections attached to said side chains, each of said sections having a convex, substantially semi-circular screen surface and a rigid member disposed beneath said screen surface and spaced therefrom with a clearance approximately equal to one-quarter the radius of said screen surface to allow air circulation between said screen surface and said rigid member and to prevent permanent deformation of said screen surface when subjected to stress greater than its elastic limit.

3. A screen conveyor comprising a pair of longitudinal supporting members; transverse conveyor sections attached to said supporting members, each of said sections having a convex screen surface and a rigid, inverted substantially V-shaped member disposed beneath said screen surface and spaced therefrom with a clearance sufficiently small to prevent permanent deformation of said screen surface when subjected to stress greater than its elastic limit.

4. A screen conveyor comprising a pair of side chains and sprocket drive means therefor; transverse conveyor sections attached to said side chains, each of said sections having a convex, substantially semi-circular screen surface and an inverted substantially V-shaped member disposed beneath said screen surface and spaced therefrom with a clearance approximately equal to one-quarter the radius of said screen surface to allow air circulation between said screen surface and said rigid member and to prevent permanent deformation of said screen surface when subjected to stress greater than its elastic limit.

No references cited.